United States Patent [19]
Arnold, Sr.

[11] Patent Number: 5,581,934
[45] Date of Patent: Dec. 10, 1996

[54] RODENT SCREEN

[76] Inventor: Thomas C. Arnold, Sr., 373 Helm Bend La., Carthage, Tenn. 37030

[21] Appl. No.: 456,924

[22] Filed: Jun. 1, 1995

[51] Int. Cl.⁶ .................. A01M 23/00; E04B 1/72
[52] U.S. Cl. ............... 43/64; 43/58; 210/162; 210/460
[58] Field of Search ................ 43/121, 124, 60, 43/64, 65, 66, 58; 114/221 R; 210/162, 459, 460, 463

[56] References Cited

U.S. PATENT DOCUMENTS

| | | | |
|---|---|---|---|
| 418,233 | 12/1889 | Sallade | 43/121 |
| 524,668 | 8/1894 | Hawkins | 210/162 X |
| 830,112 | 9/1906 | Tenold . | |
| 928,481 | 7/1909 | Tenold et al. . | |
| 961,834 | 6/1910 | Barlett . | |
| 999,106 | 7/1911 | Hagaman et al. | 43/65 |
| 1,513,650 | 10/1924 | Stanton | 210/463 |
| 1,566,199 | 12/1925 | Gaskins, Jr. | 43/121 |
| 2,224,485 | 12/1940 | Pekkala | 43/121 |
| 2,488,466 | 12/1947 | Carver | 114/221 R |
| 2,533,402 | 12/1950 | Schmitz, Jr. | 210/463 |
| 2,669,197 | 2/1954 | Van Duzer | 210/463 |
| 3,093,582 | 6/1963 | Compton | 210/463 |
| 3,398,830 | 8/1968 | Hornquist | 210/459 |
| 4,356,087 | 10/1982 | Miles | 43/66 X |
| 4,538,375 | 9/1985 | Kelley | 43/77 |
| 4,612,723 | 9/1986 | Reed | 43/60 |
| 4,757,638 | 7/1988 | Lafforthun | 43/66 |
| 4,908,976 | 3/1990 | Dagenais | 43/121 |
| 5,090,152 | 2/1992 | Ling | 43/64 |
| 5,102,537 | 4/1992 | Jones | 210/162 |

*Primary Examiner*—Joseph J. Hail, III
*Assistant Examiner*—Jay A. Stelacone
*Attorney, Agent, or Firm*—Jacobson, Price, Holman & Stern, PLLC

[57] ABSTRACT

A wire mesh rodent screen is inserted in the end of a corrugated plastic drainage pipe to prevent rodent incursions into the pipe. The screen is formed from two rectangular pieces of wire mesh. One piece is folded to form a cylinder with an in-turned lip at one end. The other piece is stamped to form a shallow dish of corresponding diameter to that of the cylinder. The dish is inserted in the cylinder to engage the lip and is secured to the lip by twisted wire ties.

9 Claims, 2 Drawing Sheets

RODENT SCREEN

BACKGROUND OF THE INVENTION

This invention relates to a rodent screen to be inserted in the end of a pipe, such as a building drainage pipe, a sewage pipe or the like.

In certain areas problems arise with rodents entering the open ends of drainage, sewage or like pipes and the present invention seeks to provide a screen which can readily be inserted in the pipe end to prevent such incursions.

SUMMARY OF THE INVENTION

It is an object of the invention to provide a rodent screen which can be easily fitted in the end of a pipe such as a corrugated plastic drainage or sewage pipe to fit snugly in the pipe and prevent rodent incursion into the pipe while also fitting sufficiently tightly into the pipe to prevent it from being dislodged by a rodent.

Another object of the invention is to provide a screen as defined above which can be readily and economically manufactured.

In fulfillment of the above and other objects, the invention provides a rodent screen for insertion into a pipe end for the purpose described, the screen being formed from wire mesh as an elongated cylindrical cup with a longitudinal slit so that the cup has radial resilience enabling the screen to be press-fitted into a pipe end of equivalent diameter.

Preferably the cup is formed from two rectangular pieces of wire mesh. A first piece of the mesh may be bent or pressed to form an elongate cylinder with a turned-in lip at one end and a slit extending the length of the cylinder. The second rectangular piece of mesh is pressed to form a shallow circular dish of like diameter to the cup. The dish is then inserted into the cup and is moved down the cup to engage the lip. The lip and the dished insert may then be secured together with twisted wire ties. The completed screen may then be inserted into a corrugated plastic or other pipe of like inside diameter with the slit cup providing sufficient resilience to the screen to facilitate insertion and removal while the length of the cup hinders dislodgement of the screen by a rodent.

Additional features and advantages of the invention will become apparent from the ensuing description and claims read in conjunction with the attached drawings.

DETAILED DESCRIPTION OF THE PREFERRED EMBODIMENTS

Figure 1:
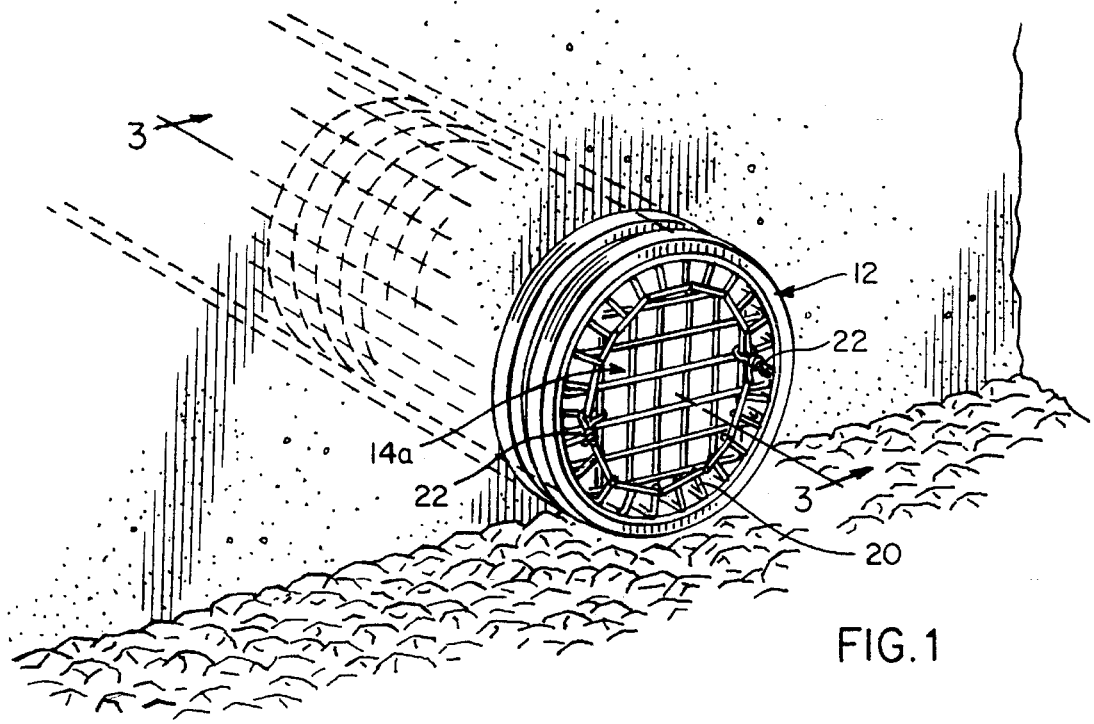
FIG. 1 is a perspective view of the end of a drainage pipe extending from a building and fitted with a rodent screen according to the invention.
Figure 2:
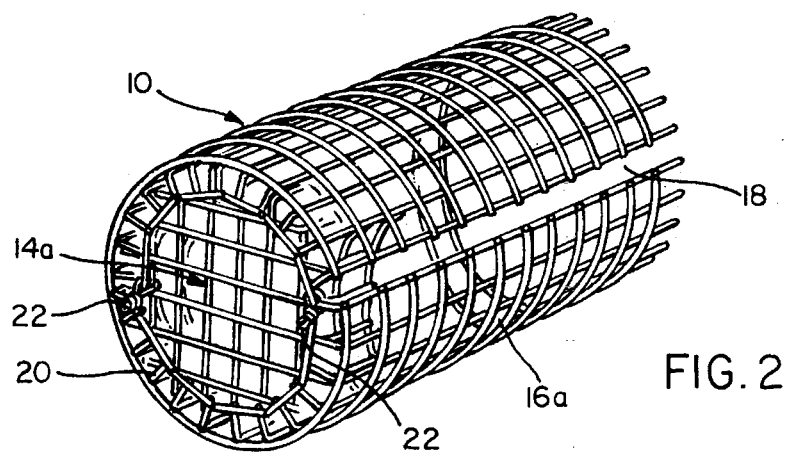
FIG. 2 is a perspective view of the screen.
Figure 3:
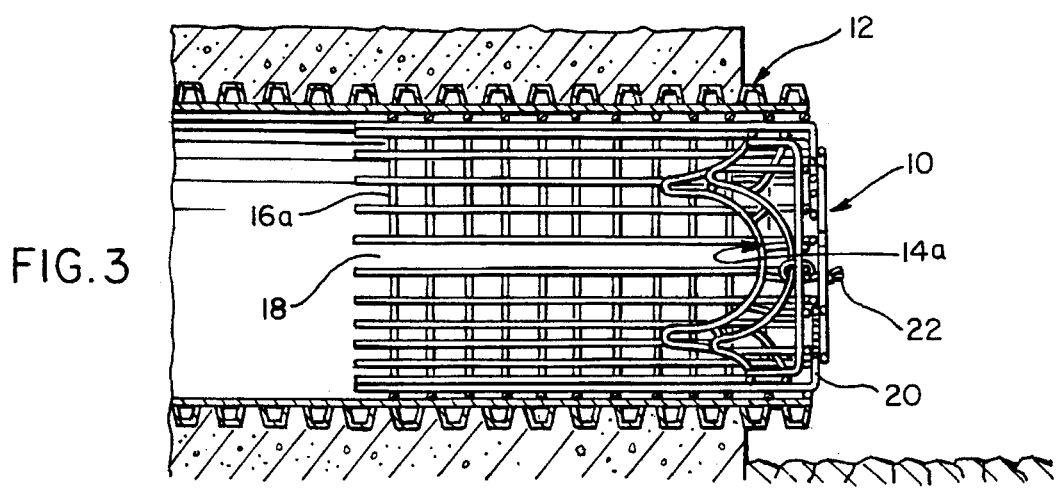
FIG. 3 is a longitudinal sectional view of the assembly shown in FIG. 1.
Figure 4:
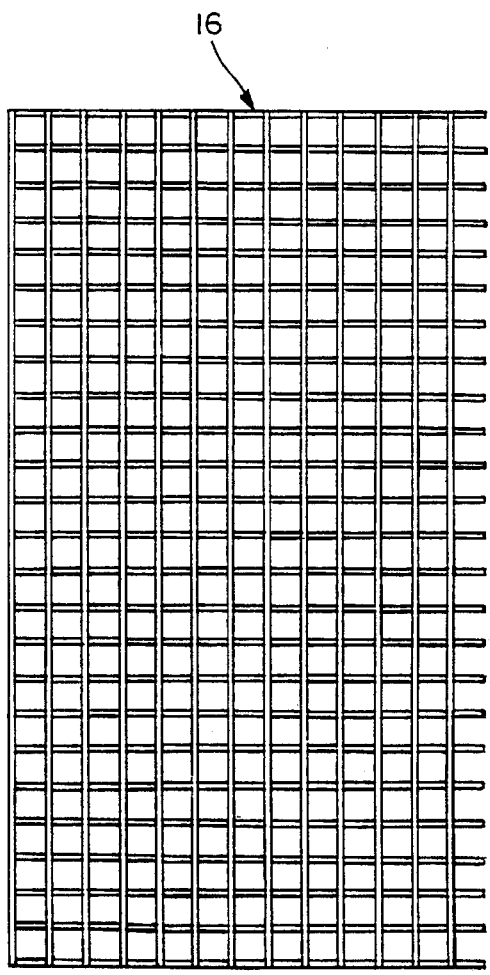
FIGS. 4 and 5 are plan views of two components of the screen prior to forming.
Figure 5:
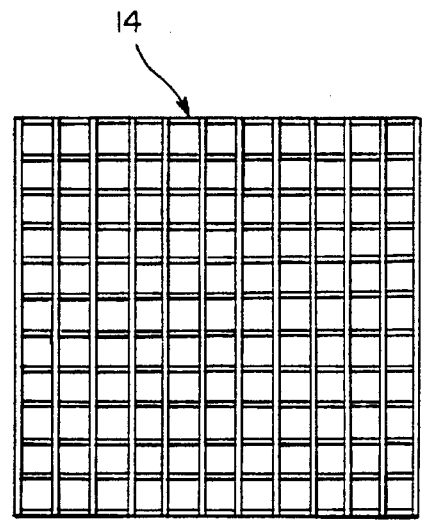

A rodent screen 10, as best seen in FIG. 2, is in the form of an elongate cylindrical cup, for example about 6 inches in length and having an outside diameter to fit any size pipe end, for example a four inch or six inch diameter corrugated plastic drainage pipe 12. The screen is made up of wire mesh components including first and second rectangular wire mesh pieces 14, 16, FIGS. 4 and 5. The wire mesh may, conveniently, comprise ½ inch x½ inch welded hot galvanized wire mesh having a 0.063" min. wire diameter.

In forming the screen 10, the larger rectangular piece 16 is rolled to form a cylindrical cup 16a with a longitudinal slit 18 and one end is folded over to form an inwardly directed lip 20 having, for example, a width of about ½". For a four inch I.D. pipe, piece 16 may, for example, be about 6"×12" prior to forming.

Figure 6:
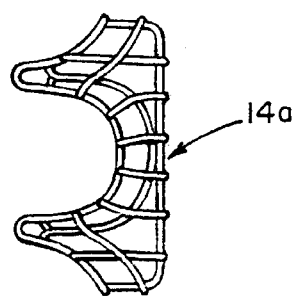
FIGS. 6 and 7 are a side view and end view of one of the components after forming.
Figure 7:
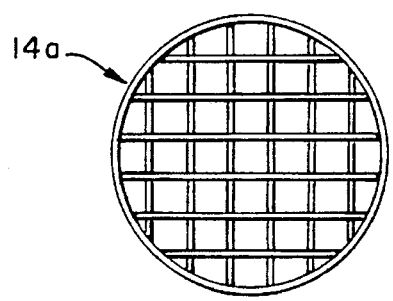

The smaller rectangular piece 14, which may be about 5"×5" prior to forming, is stamped and rolled to form a shallow dish 14a of circular section (see FIGS. 6 and 7) having a diameter corresponding to that of cup 16a.

To complete the screen, dish 14a is inserted into the cup from the end opposite lip 20 and is moved down to engage the lip. The dish is then secured to lip 20 by twisted wire ties 22.

As shown in the drawings, the mesh piece 16 at its end remote from the lip 20 may have the last wire strand omitted in order to facilitate insertion into the pipe.

The screen is sufficiently resilient radially to enable it to be fitted into the end of pipe 12 and retained therein. The length of the screen stabilizes it within the pipe and inhibits its dislodgement by a rodent.

While only a preferred embodiment of the invention has been described herein in detail, the invention is not limited thereby and modifications are possible within the scope of the attached claims.

I claim:

1. A rodent screen for insertion into an open end of a cylindrical pipe to preclude entry of rodents into the pipe, said pipe having an inside diameter, said rodent screen comprising a wire mesh cylinder having an outside diameter and a wire mesh closure at one end thereof, the outside diameter of said wire mesh cylinder approximating the inside diameter of the pipe, said wire mesh cylinder including means providing said cylinder with limited radial compressibility to permit said rodent screen to be frictionally received within the pipe in use wherein said wire mesh cylinder has an inwardly directed lip at one end, and said wire mesh closure comprises a wire mesh dish secured to said lip.

2. A rodent screen as claimed in claim 1 further including twisted wire ties securing said dish to said lip.

3. A rodent screen as claimed in claim 1 wherein said dish comprises a stamped rectangular piece of wire mesh.

4. A rodent screen for insertion into an open end of a cylindrical pipe to preclude entry of rodents into the pipe, said pipe having an inside diameter, said rodent screen comprising a wire mesh cylinder having an outside diameter and a wire mesh closure at one end thereof, the outside diameter of said wire mesh cylinder approximating the inside diameter of the pipe, said wire mesh cylinder including means providing said cylinder with limited radial compressibility to permit said rodent screen to be frictionally received within the pipe in use wherein said means to provide said cylinder with limited radial compressibility includes a slit extending longitudinally along the periphery of said wire mesh cylinder over at least a major portion of the length of said wire mesh cylinder and terminating at the end opposite said wire mesh closure.

5. A rodent screen as claimed in claim 4 wherein said cylinder, including an in-turned lip at one end, comprises a folded rectangular piece of wire mesh.

6. A combination comprising a pipe such as a drainage or sewage pipe having an open end and an inside diameter and a rodent screen inserted in said open end of said pipe to preclude incursions of rodents, said rodent screen comprising an elongated wire mesh cylinder having an outside diameter approximating the inside diameter of said pipe, a wire mesh closure at one end of said cylinder, said cylinder being radially compressible and frictionally received within said pipe, wherein said screen comprises a wire mesh cylinder having an in-turned lip at said one end and said wire mesh closure is secured to said lip.

7. A combination as defined in claim 6 wherein said pipe comprises a corrugated plastic pipe.

8. A combination as defined in claim 6 including twisted wire ties securing said closure to said lip.

9. A combination comprising a pipe such as a drainage or sewage pipe having an open end and an inside diameter and a rodent screen inserted in said open end of said pipe to preclude incursions of rodents, said rodent screen comprising an elongated wire mesh cylinder having an outside diameter approximating the inside diameter of said pipe, a wire mesh closure at one end of said cylinder, said cylinder being radially compressible and frictionally received within said pipe, wherein said cylinder includes a longitudinally extending slit extending along its periphery over at least a major portion of the length of said cylinder and terminating at the end opposite said wire mesh closure to provide said cylinder with radial compressibility.

* * * * *